United States Patent
Hillen et al.

(10) Patent No.: US 9,816,427 B2
(45) Date of Patent: Nov. 14, 2017

(54) CATALYTIC CONVERTER DEVICE FOR A STATIONARY INTERNAL COMBUSTION ENGINE

(71) Applicant: GE Jenbacher GmbH & Co OG, Jenbach (AT)

(72) Inventors: Friedhelm Hillen, Jenbach (AT); Michael Url, Neufahrn (DE); Max Mehring, Bruck am Ziller (AT); Manfred Sieberer, Langkampfen (AT); Bhuvaneswaran Manickam, Rattenberg (AT)

(73) Assignee: GE Jenbacher GMBH & CO OG, Jenbach (AT)

( * ) Notice: Subject to any disclaimer, the term of this patent is extended or adjusted under 35 U.S.C. 154(b) by 0 days.

(21) Appl. No.: 14/935,630

(22) Filed: Nov. 9, 2015

(65) Prior Publication Data
US 2016/0131014 A1 May 12, 2016

(30) Foreign Application Priority Data
Nov. 10, 2014 (AT) .............................. A 50823/2014

(51) Int. Cl.
*F01N 3/00* (2006.01)
*F01N 13/18* (2010.01)
(Continued)

(52) U.S. Cl.
CPC ........... *F01N 13/18* (2013.01); *B01D 53/944* (2013.01); *B01D 53/9431* (2013.01); *F01N 3/206* (2013.01); *F01N 3/2066* (2013.01); *F01N 3/28* (2013.01); *F01N 3/2807* (2013.01); *F01N 3/2882* (2013.01); *F01N 13/017* (2014.06);
(Continued)

(58) Field of Classification Search
USPC ......... 60/274, 280, 286, 295, 297, 299, 301, 60/303; 422/171, 177, 180
See application file for complete search history.

(56) References Cited

U.S. PATENT DOCUMENTS 6,148,613 A * 11/2000 Klopp ....................... F01N 3/20
137/625.43
6,340,066 B1 * 1/2002 Dettling ................. B01D 53/02
180/54.1
(Continued)

FOREIGN PATENT DOCUMENTS

DE 199 21 263 11/2000
DE 10123359 A1 11/2002
(Continued)

OTHER PUBLICATIONS

European Search Report issued Mar. 24, 2016 in corresponding European Patent Application No. 15193604 (with English translation).

*Primary Examiner* — Binh Q Tran
(74) *Attorney, Agent, or Firm* — GE Global Patent Operation (57) ABSTRACT

A catalytic converter device for a stationary internal combustion engine includes at least one bracket for mounting the catalytic converter device on a carrier, and at least one catalyst substrate which can be releasably arranged in a housing of the catalytic converter device, the catalyst substrate having a cell density of at least 50 cpsi, preferably greater than 100 cpsi.

24 Claims, 9 Drawing Sheets

(51) Int. Cl.
  *F01N 3/28*    (2006.01)
  *F01N 13/00*   (2010.01)
  *B01D 53/94*   (2006.01)
  *F01N 3/20*    (2006.01)
  *F02B 33/40*   (2006.01)
  *F02B 37/00*   (2006.01)

(52) U.S. Cl.
  CPC .......... F02B 33/40 (2013.01); F02B 37/001 (2013.01); *F01N 2350/00* (2013.01); *F01N 2450/30* (2013.01); *F01N 2590/10* (2013.01); *Y02T 10/144* (2013.01)

(56) References Cited

U.S. PATENT DOCUMENTS

| | | | |
|---|---|---|---|
| 6,475,453 B1* | 11/2002 | Mathes | B01D 53/9431 422/169 |
| 8,466,083 B2* | 6/2013 | Schmieg | B01D 53/9418 422/171 |
| 9,528,413 B2 | 12/2016 | Katare et al. | |
| 9,616,383 B2* | 4/2017 | Reichert | B01D 53/9431 |
| 9,695,725 B2* | 7/2017 | Reichert | F01N 3/2066 |
| 2002/0061268 A1 | 5/2002 | Bruck et al. | |
| 2004/0009874 A1 | 1/2004 | Koike et al. | |
| 2006/0153748 A1* | 7/2006 | Huthwohl | B01F 3/04049 422/172 |
| 2008/0264048 A1* | 10/2008 | Nishiyama | B01D 53/9431 60/299 |
| 2010/0037607 A1* | 2/2010 | Doring | F01N 3/0231 60/602 |
| 2010/0115932 A1 | 5/2010 | Kassel et al. | |
| 2011/0162347 A1 | 7/2011 | Katare et al. | |
| 2011/0173951 A1* | 7/2011 | Spurk | F01N 13/0093 60/274 |
| 2014/0178263 A1 | 6/2014 | Baig et al. | |
| 2015/0247438 A1 | 9/2015 | Klinder | |

FOREIGN PATENT DOCUMENTS

| | | |
|---|---|---|
| DE | 10 2005 056 423 | 6/2006 |
| DE | 10 2008 043 726 | 5/2009 |
| DE | 10 2011 079 785 | 2/2012 |
| EP | 0690212 B1 | 1/1996 |
| EP | 1 367 233 | 12/2003 |
| EP | 2325450 B1 | 3/2014 |
| JP | 54-71766 | 6/1979 |
| JP | 54-84868 | 7/1979 |
| JP | 62-121638 | 6/1987 |
| JP | 62-191026 | 8/1987 |
| JP | 38 25 958 | 2/1990 |
| JP | 2009-7977 | 1/2009 |
| WO | 0009869 A1 | 2/2000 |

* cited by examiner

CATALYTIC CONVERTER DEVICE FOR A STATIONARY INTERNAL COMBUSTION ENGINE

BACKGROUND OF THE INVENTION

The invention concerns a catalytic converter device for a stationary internal combustion engine. The invention further concerns an arrangement of at least one stationary internal combustion engine with at least one catalytic converter device.

To comply with emission limit values internal combustion engines are frequently equipped with exhaust gas after-treatment installations which reduce the pollutants contained in the exhaust gas to the permissible degree by chemical-physical processes.

In particular stationary internal combustion engines as are frequently used for example for decentralized power generation often have elaborate exhaust gas after-treatment installations for reducing the emissions of particulate matter (PM), unburnt hydrocarbons (HC), carbon monoxide (CO) and nitrogen oxides (NOx). Filters are mostly used for the separation of particulate matter, while catalytic converter devices are used for reduction of the species HC, CO, NOx and possibly other chemically convertible substances.

Exhaust gas after-treatment installations for stationary internal combustion engines are always designed for the limit values which are to be complied with at the present time, for economic reasons. A disadvantage with the solutions known from the state of the art is that, if the limit values are later intensified, for example by legislation, the installations generally have to be modified from scratch.

US 2014/0178263 A1 shows a catalytic converter device which can only be used in connection with Diesel engines. An injection device for a reduction device (reference sign 152), which injection device is arranged inside the catalytic converter device.

DE 199 21 263 A1 and EP 1 367 233 A2 show catalytic converter devices with an extremely high cell density, which can only be used in mobile machines, but not in stationary combustion engines because if they were used in stationary combustions engines the pressure decrease would be too high.

DE 10 2008 043 726 A1 shows an arrangement according to the preamble of claim 9 in which an injection device is arranged centrally inside an exhaust gas conduit. The injection device is aligned inclined relative to a axial direction of the exhaust gas conduit. This only works ammonia is used as a reduction agent. If a two component reduction agent were to be used (e.g. a urea solution mixed with air) the two component reduction agent would collide with a housing of the exhaust gas conduit.

US 2015/0247438 A1 shows a catalytic converter device in which a plurality of plate converters are stacked on each other. If pressure pulsations or pressure peaks arise single or several plate converters can be displaced in direction of the exhaust gas stream.

SUMMARY OF THE INVENTION

An object of the invention therefore is to provide a catalytic converter device for a stationary internal combustion engine, which facilitates retro-fitment of an exhaust gas after-treatment installation with that catalytic converter device, while keeping to the existing installation space.

A further object of the invention is to provide an arrangement of at least one stationary internal combustion engine with at least one catalytic converter device, which is particularly compact and therefore space-saving.

The fact that the catalyst substrate has a cell density of at least 50 cpsi, preferably greater than 100 cpsi, makes it possible to achieve a particularly compact structure. Because cell density is less than 350 cpsi, preferably less than 300 cpsi, the occurrence of an unacceptably large pressure decrease within the stationary combustion engine is avoided.

The unit cpsi (cells per square inch) is usual for characterizing catalyst substrates in respect of their cell density (number of cells per unit of surface area of the end face).

The choice of the cell densities which are unusually high for stationary applications allows a structure which is shortened in comparison with the state of the art.

The high cell density provides a large surface area with additionally increased turbulence, which synergistically leads to a reduced necessary structural space.

It can preferably be provided that the catalyst substrate is at least predominantly and preferably completely metallic. The particular advantage in using metallic catalyst substrates is that no heat stresses occur between the frame and the substrate as both components are matched in respect of their coefficient of thermal expansion.

It can particularly preferably be provided that the bracket for mounting the catalytic converter device is adapted for upright fitment of the catalytic converter device. The catalytic converter device according to the invention is particularly suitable for an upright arrangement. For that purpose the catalytic converter device is mounted to a frame in an upright position by way of the bracket.

It can particularly preferably be provided that the catalyst substrate is arranged in the housing in the form of a plurality of substrate blocks. It has proven to be particularly advantageous if the substrate blocks in their installation position are connected together releasably from each other and are gas-tightly sealed relative to each other, preferably by way of positively locking connections.

It can preferably be provided that the positively locking connections are in the form of connecting bars which can be hung in a frame disposed in the housing of the catalytic converter device. The particular advantage of the arrangement of the substrate blocks in connecting bars is that the side surfaces of the substrate blocks are guaranteed to be sealed off without additional sealing means solely by the inherent weight of the substrate blocks and the choice of the appropriate tolerances. The particular advantage of the frame in which the substrate blocks can be suspended is that the same frame can be used for substrate blocks of differing depth. There could be for example applications which require a catalyst of greater length. The frame then also affords the possibility of suspending other dimensions of substrate blocks.

According to the inventive embodiment the substrate blocks can be arranged on the frame, which frame is fixedly connected to a housing of the catalytic converter device. This prevents negative effects of pressure pulsations or pressure peaks on the substrate blocks. E.g. if there are pressure shocks and the substrate blocks are only stacked on each other inside a collective housing, single or several substrate blocks could be displaced in direction of the exhaust gas stream.

It can preferably be provided that the substrate blocks are cuboidal.

It can be provided that the substrate blocks have at least one respective coupling location, preferably an opening, for coupling a lifting means thereto. The coupling location permits the substrate blocks to be lifted and placed by coupling a lifting means. That allows secure handling and prevents damage to the substrate blocks.

Particularly preferably the catalytic converter device serves for selective catalytic reduction, that is to say as an SCR catalytic converter. The scenario described in the opening part of this specification of retro-fitment of an exhaust gas after-treatment installation can be implemented in particular by an intensification of the $NO_x$ limit values. The invention in particular simplifies retro-fitment of an exhaust gas after-treatment installation with an SCR catalytic converter by virtue of the compact structure of the catalytic converter device and the arrangement.

The catalytic converter device can be in the form an SCR catalytic converter, an oxidation catalytic converter or an NH3 slip catalytic converter. The catalytic converter device is not limited to a catalytic converter for selective catalytic reduction (SCR) but can also be applied to an oxidation catalytic converter. An SCR catalytic converter converts nitrogen oxides into nitrogen in the presence of a reducing agent, generally a urea solution.

An oxidation catalytic converter is typically used for breaking down carbon monoxide (CO) and unburned hydrocarbons (HC). An NH3 slip catalytic converter is used for reducing an ammonia (NH3) which originates from the selective catalytic reduction and which is possibly not completely reacted.

The catalyst substrate is naturally selected for the respective task. Thus the catalyst substrates differ for example in their coating for the above-mentioned tasks.

In the case of oxidation catalytic converters the cell density can assume even higher values, for example 400 cpsi.

According to the invention the combustion engine of the arrangement is a stationary gas engine.

In regard to the arrangement it is preferably provided that the at least one injection device is arranged downstream of the at least one exhaust gas turbine and upstream of the at least one catalytic converter device.

It can particularly preferably be provided that the at least one injection device is arranged upstream of the at least one muffler.

It is possible in that way to achieve a particularly compact arrangement as the downstream-disposed pipe and optionally the muffler serve as a mixing section for the reducing agent.

It can be provided, that the at least one injection device is preferably a two-component injection device with a first component in form of a liquid reduction agent solution, preferably a urea solution, and a second component in form of air It can be provided that there are provided at least two exhaust gas turbines which are arranged in parallel fluidic relationship and the at least one injection device is arranged in the exhaust gas flow of a manifold downstream of the at least two exhaust gas turbines. That variant describes the situation where the injection device is disposed in the exhaust gas flow after the junction of the exhaust gas conduits leading from the exhaust gas turbines.

It can be provided that there are provided at least two exhaust gas turbines arranged in parallel fluidic relationship and either an injection device is arranged only in the exhaust gas flow of one of the exhaust gas turbines or at least one respective injection device is arranged in the exhaust gas flow of each of the at least two exhaust gas turbines. That variant describes the situation where the injection device is disposed in the exhaust gas flow of an individual exhaust gas turbine or in the respective exhaust gas flows of the individual exhaust gas turbines. In other words here the injection device is placed upstream of a manifold combining the respective exhaust gas flows.

Preferably it can be provided that the exhaust gas flow can be guided in an exhaust gas conduit having at least one curved portion, wherein the at least one injection device is arranged upstream of the at least one curved portion of the exhaust gas conduit.

It can preferably be provided that disposed in the at least one curved portion is a deflection device, preferably a baffle plate, arranged in an injection means of the injection device.

Injection of the reducing agent upstream of a curved portion of the exhaust gas conduit, wherein a deflection device, preferably a baffle plate, is provided in the curved portion, has proven to be particularly desirable as the reducing agent is vaporized at the deflection device more quickly than it would normally vaporize in the curved portion of the exhaust gas conduit. It is further desirable if the deflection device reduces or avoids a thermal shock due to the relatively cool reducing agent impinging on the exhaust gas conduit which is heated by the exhaust gases.

It can preferably be provided that the exhaust gas flow can be guided in an exhaust gas conduit having at least one conical portion which enlarges downstream, wherein the at least one injection device is arranged in the conical portion and wherein preferably the conical portion is arranged immediately downstream of the at least one exhaust gas turbine.

Injection of the reducing agent in the enlarging portion of a conical region of the exhaust gas conduit has proven to be particularly desirable for thorough mixing of the reducing agent with the exhaust gas.

For promoting thorough mixing, independently thereof or to assist therewith, it is preferably provided that the injection device is arranged close to the at least one turbocharger such that a residual swirl imposed on the exhaust gas flow by the turbocharger promotes mixing of the injected reducing agent and the exhaust gas flow.

The residual swirl has the further advantage of functioning like a shield by preventing a collision of the injected reduction agent with the housing of the exhaust gas conduit.

Preferably it is foreseen that the injection device is aligned axially inside the exhaust gas conduit and preferably at least approximately centrally. This prevents a collision of the injected reduction agent with the housing of the exhaust gas conduit. If this measure is provided in combination with an arrangement of the injection device sufficiently near to the turbo charger, that the above mentioned rest swirl is still present, the rest swirl acts as a focusing means for the injected reduction agent. In order to prevent the formation of a back current caused by the arrangement of the injection device near the turbo charger it can be advantageous to arrange a stream guidance means (e.g. a sheet metal or pipe) between the turbo charger and the injection device.

A flow equalization distributor, for example in the form of an apertured plate, can be arranged upstream of the catalytic converter device.

The stationary internal combustion engine can preferably be a gas engine, in particular a gas engine operated on the Otto cycle.

BRIEF DESCRIPTION OF THE DRAWINGS

The invention is described in greater detail hereinafter with reference to the Figures in which.

DETAILED DESCRIPTION OF THE INVENTION

Figure 1:
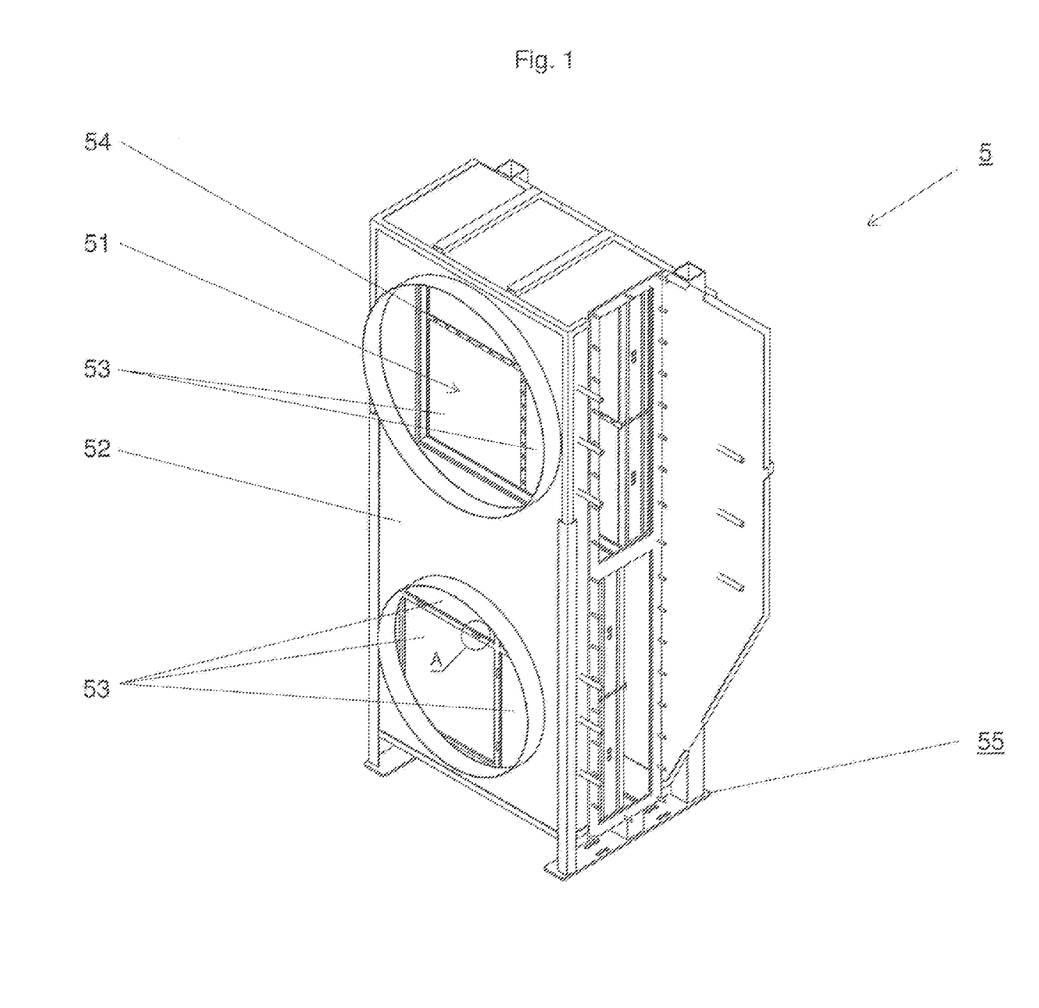
FIG. 1 shows a perspective view of a catalytic converter device.

FIG. 1 shows a perspective view of a catalytic converter device 5.

The housing 52 is here a cuboidal sheet metal structure in which the catalyst substrate 51 is arranged as a carrier for the actual catalytic reaction. The round openings through which the exhaust gas can flow into and out of the catalytic converter unit 5 provide a view on to the structure therein.

The catalyst substrate 51 is provided in the form of substrate blocks 53. The substrate blocks 53 are connected together by way of the positively locking connection 54. The positively locking connections 54 are here in the form of connecting bars. The substrate blocks 53 are held in position and sealed off relative to each other by the connecting bars. The variant is particularly advantageous, in which sealing integrity of the side surfaces of the substrate blocks is ensured without additional sealing means solely by virtue of the inherent weight of the substrate blocks and the choice of the appropriate tolerances. The catalytic converter device 5 further has a bracket 55, by way of which the catalytic converter device 5 can be mounted. In stationary applications mounting of the catalytic converter device 5 is generally in an upright position.

Figure 2A:
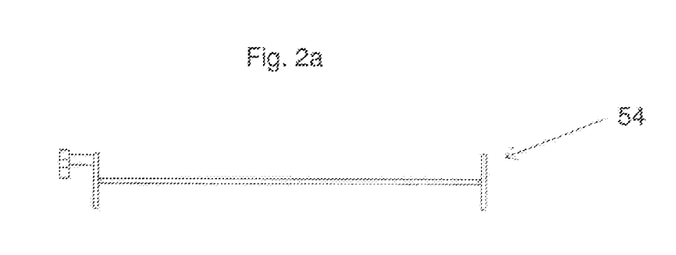
FIGS. 2a through 2d show structural details of the catalytic converter device.

FIG. 2a shows the detail A in FIG. 1 in a longitudinal section. The Figure shows the positively locking connection 54 which can receive the substrate blocks 53.

Figure 2B:
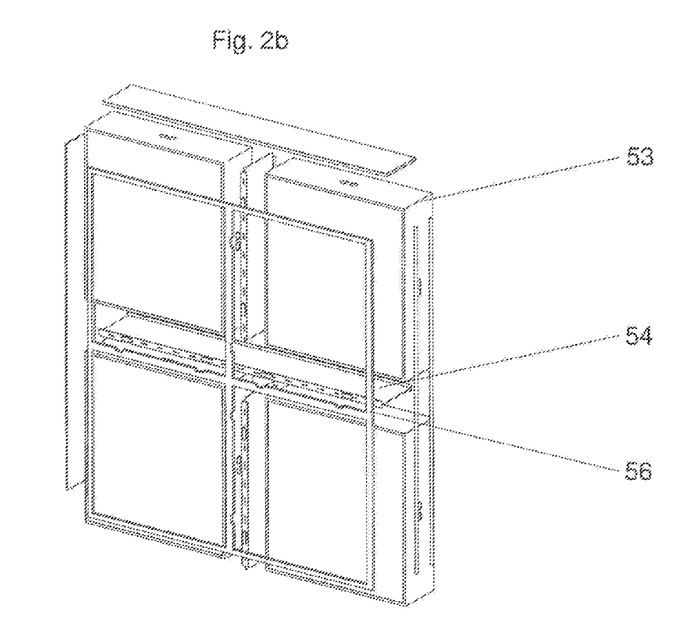

FIG. 2b shows an exploded view of the substrate blocks 53, the positively locking connection 54, here in the form of connecting bars, and the frame 56. The Figure shows how the substrate blocks 53 are held by way of the positively locking connection 54 and then the assembly of the substrate blocks 53 with the positively locking connection 54 can be suspended in the frame 56.

Figure 2C:
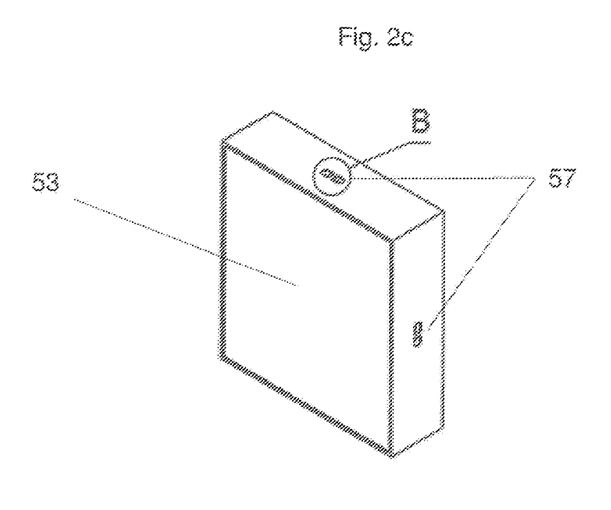

FIG. 2c shows a perspective view of a substrate block 53. The Figure shows the coupling locations 57 (detail B) at the side surfaces of the substrate block 53.

Figure 2D:
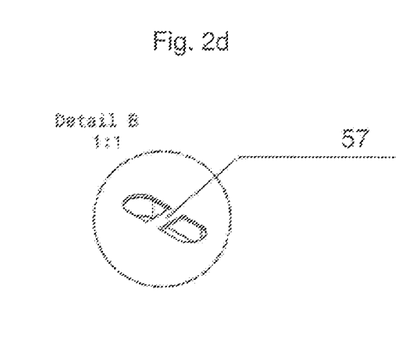

FIG. 2d shows the coupling location 57 corresponding to the detail B from FIG. 2. The coupling location 57 allows the substrate block 53 to be securely lifted and oriented.

Figure 3:
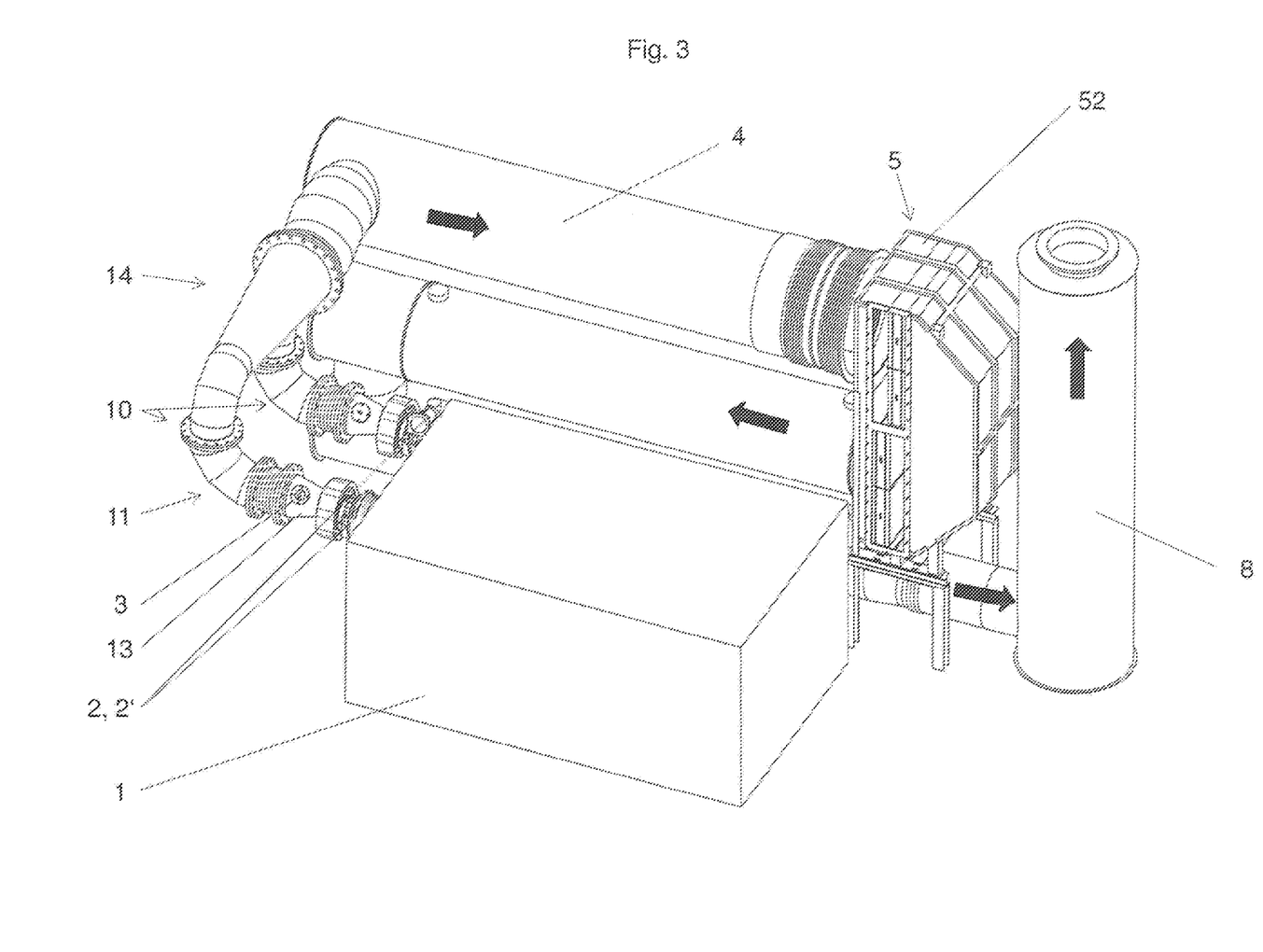
FIG. 3 is a perspective view of an arrangement including a catalytic converter device.

FIG. 3 shows a perspective view of an embodiment of an arrangement according to the invention. An internal combustion engine 1 is connected to two parallel-connected exhaust gas turbines 2, 2', downstream of which is arranged a conical portion 13 of the exhaust gas conduit 10. An injection device 3 injects reducing agent into the conical portion 13. Downstream thereof the exhaust gas conduit 10 has a curved portion 11 with integrated deflection device 12 (not visible in this view). That is followed by a manifold 14 opening into a muffler 4. The housing 52 of the catalytic converter device 5 is to be seen downstream of the muffler 4. The flow direction of the exhaust gases is symbolically indicated by bold black arrows. In this embodiment the catalytic converter device 5 causes a 180° deflection of the exhaust gases. Connected downstream thereof are two exhaust gas heat exchangers and a flue stack 8 for discharge of the treated gases.

Figure 4:
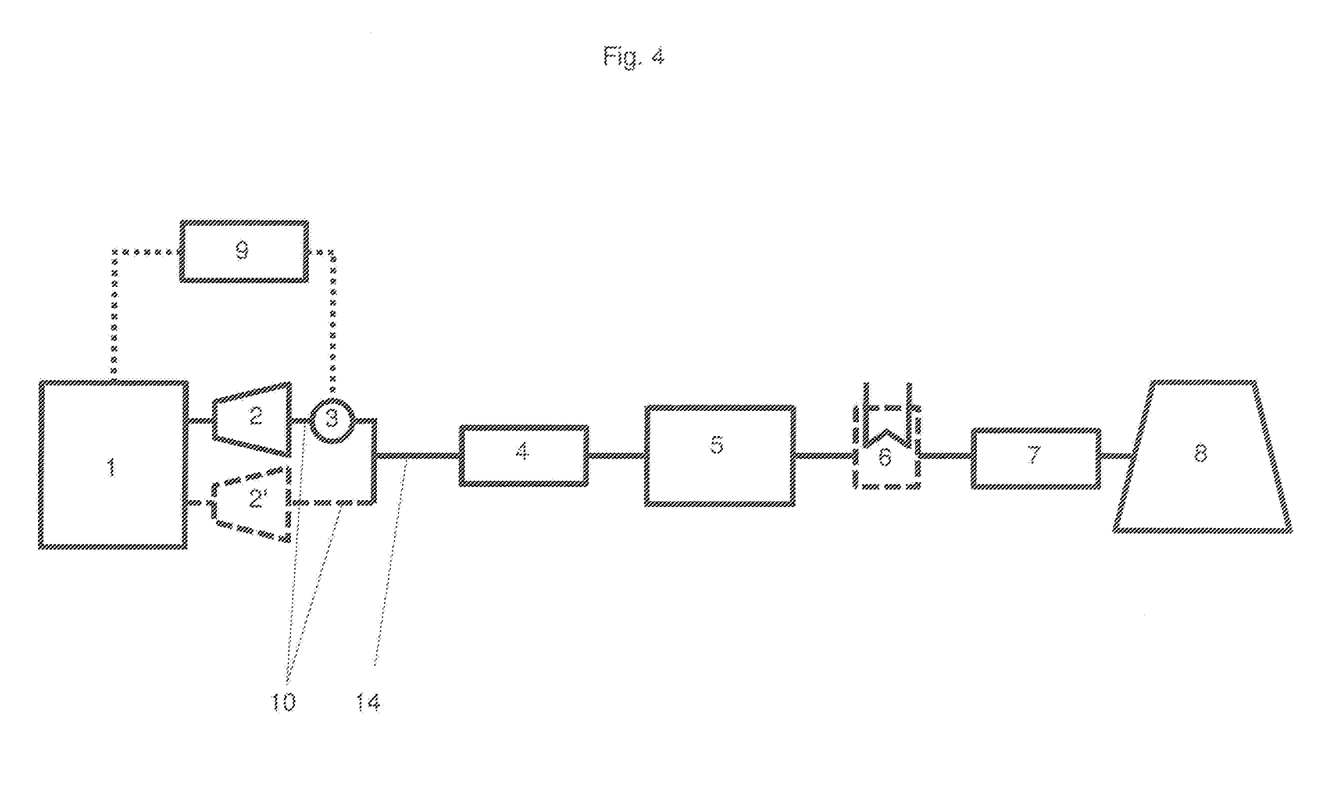
FIG. 4 shows an arrangement according to a first embodiment.

FIG. 4 shows an arrangement with a catalytic converter device 5 in a first embodiment. In this case two parallel exhaust gas turbines 2, 2' are provided in the exhaust gas flow from the internal combustion engine 1. The exhaust gas is carried by way of the exhaust gas conduit 10. Here the injection device 3 is arranged in the exhaust gas flow of an individual exhaust gas turbine 2. The injection device 3 is controlled by way of the open-loop/closed-loop control device 9. Downstream of the exhaust gas turbines 2, 2' there follows a first muffler 4 and the catalytic converter device 5. Provided after the catalytic converter device 5 is an exhaust gas heat exchanger 6 from which the exhaust gases are further passed through an end muffler 7 to the flue stack 8. In a variant a separate injection device 3 can be provided downstream of each of the exhaust gas turbines 2, 2'.

Figure 5:
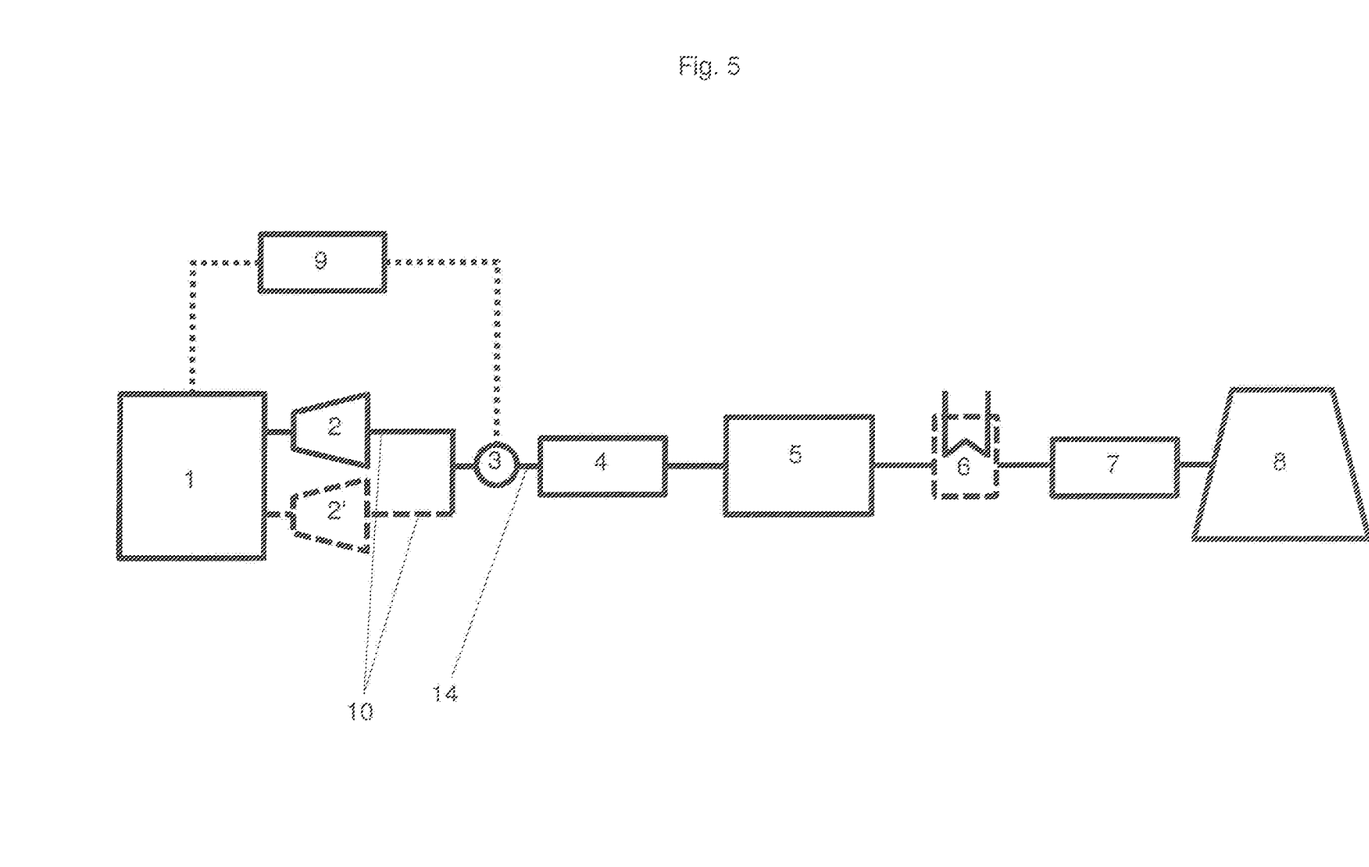
FIG. 5 shows an arrangement according to a second embodiment.

FIG. 5 shows an arrangement of an internal combustion engine 1 with a catalytic converter device 5 according to a second embodiment. As in the previous embodiment in this case also there are two exhaust gas turbines 2, 2' in a parallel arrangement. In this case however the injection device 3 is disposed in a manifold 14 after the individual exhaust gas conduits 10 are combined after the exhaust gas turbines 2, 2'. Otherwise the structure of the arrangement in FIG. 5 is the same as the embodiment of FIG. 4.

Figure 6A:
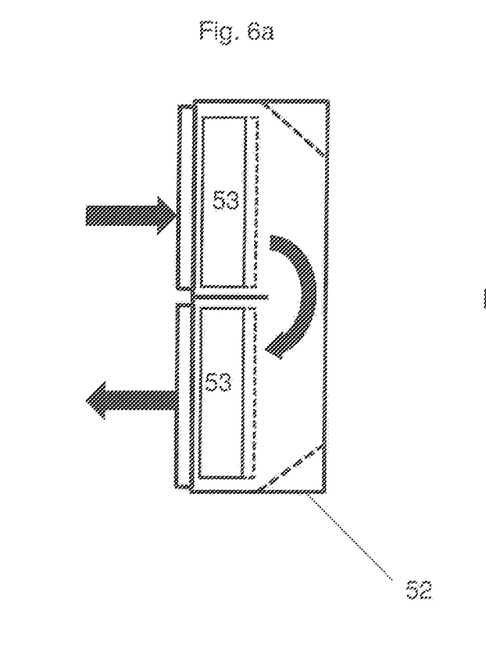
FIGS. 6a through 6c show variants in the flow through the catalytic converter device.
Figure 6B:
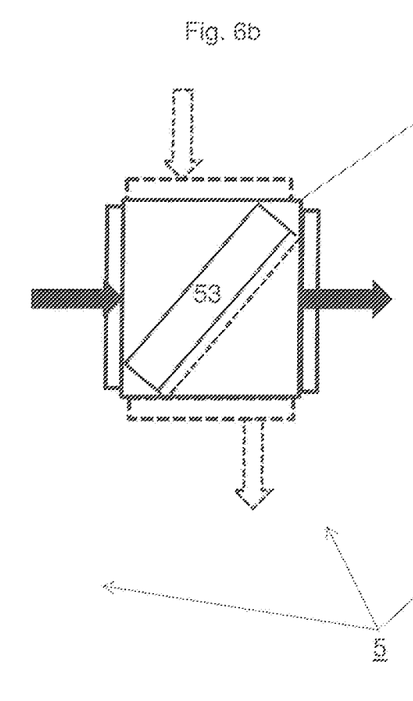
Figure 6C:
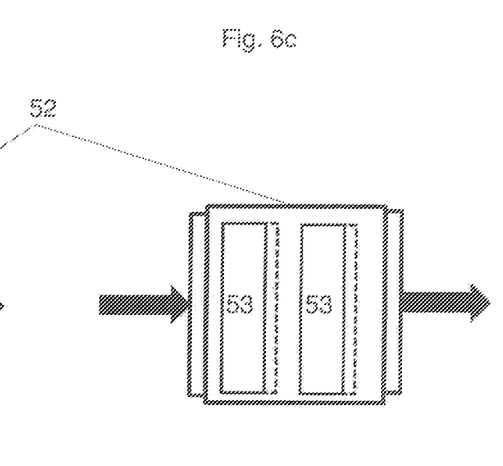

FIGS. 6a through 6c show plan views of variants of the afflux flow of the catalytic converter device 5. The flow direction of the exhaust gas is symbolically represented by the black arrows.

In the FIG. 6a variant the exhaust gas flows by way of an end into the housing 52, flows through a first substrate block 53, is deflected and issues on the intake side again through a further substrate block 53. That arrangement is suitable in particular for structural implementations in which a straight-line flow path is not possible. The external dimensions of an exhaust gas installation with a catalytic converter device in accordance with this variant can be particularly compact.

In the variant shown in FIG. 6b the exhaust gas flows through a front end into the housing 52 and issues again on the rear side. The substrate block 53 is installed in a diagonally inclined position, thereby giving an increased afflux surface area for the substrate block 53, in comparison with a right-angled afflux flow. The broken-line arrows indicate that, with the same housing 52, further variations in the flow through the arrangement can be achieved. Thus in a modification of this variant, a deflection of the exhaust gas flow through 90° could be effected. The variant of FIG. 6c shows the situation with two substrate blocks 53 connected in serial succession. As already indicated the housing 52 together with frame 56 (not shown here) permits the catalytic converter device 5 to be of a modular design. As indicated by the broken lines, the individual substrate blocks 53 can also be deeper in the flow direction, as there is always still enough structural space remaining in the housing 52.

If the application requires it, for example a plurality of substrate blocks 53 can be arranged in series without having to modify anything on the housing 52.

Figure 7A:
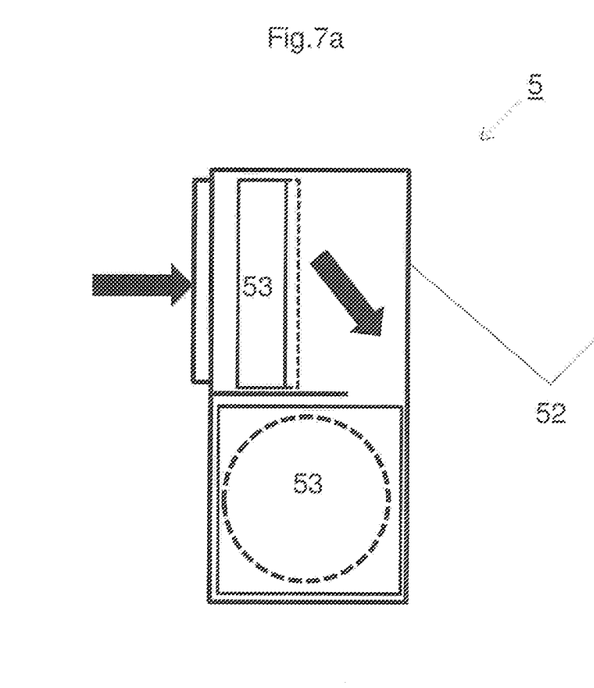
FIGS. 7a and 7b show further variants in the flow through the catalytic converter device.
Figure 7B:
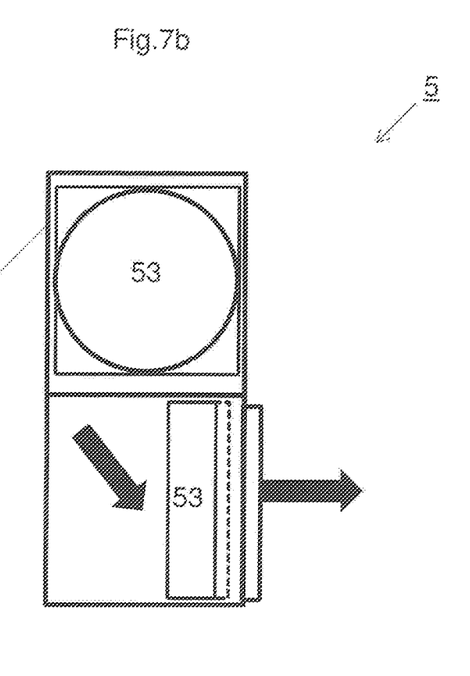

FIGS. 7a and 7b show a further variant of the afflux flow for the catalytic converter device 5, FIG. 7a showing a side view and FIG. 7b showing a front view of the same embodiment. As can be seen from FIG. 7a the exhaust gas flows into the housing 52 which is here configured on edge, is deflected downwardly and through 90° and leaves the housing 52 again. The broken-line circle in FIG. 7a shows the outlet from the housing. The outlet is here on the rear side, that is to say it is not visible and is shown in broken line for that reason. FIG. 7b shows a front view of the variant. In this case also it would be possible to envisage a modification whereby the exhaust gases are deflected through 180° and flow away in the same plane as the afflux flow.

Figure 8A:
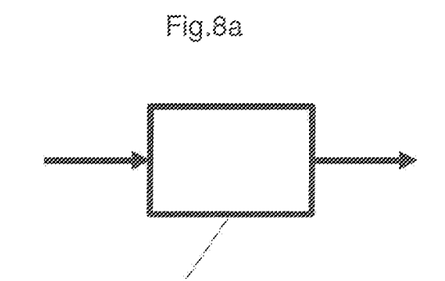
FIGS. 8a through 8c are diagrammatic views of the afflux flow to the catalytic converter device.
Figure 8B:
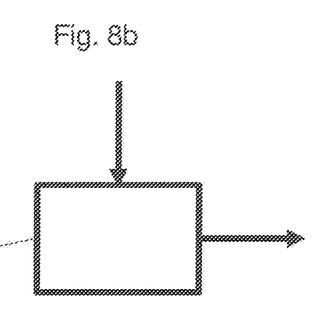
Figure 8C:
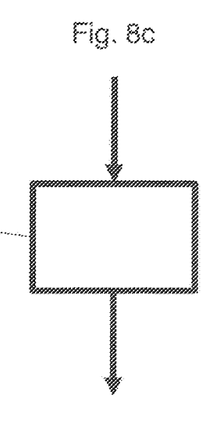

FIGS. 8a through 8c diagrammatically show the above-discussed variants for the afflux flow of a catalytic converter device 5.

In accordance with the view in FIG. 7a the exhaust gas flows in through the front side of the catalytic converter device 5 and away by way of the rear side.

The variant in FIG. 8b shows the situation wherein the exhaust gas flows in by way of the side surface of the catalytic converter device 5 and flows away again by way of the downstream end face of the catalytic converter device 5.

FIG. 8c shows the variant in which the exhaust gas flows in by way of a side surface of the catalytic converter device 5 and flows out again also by way of a side surface of the catalytic converter device 5.

Figure 9:
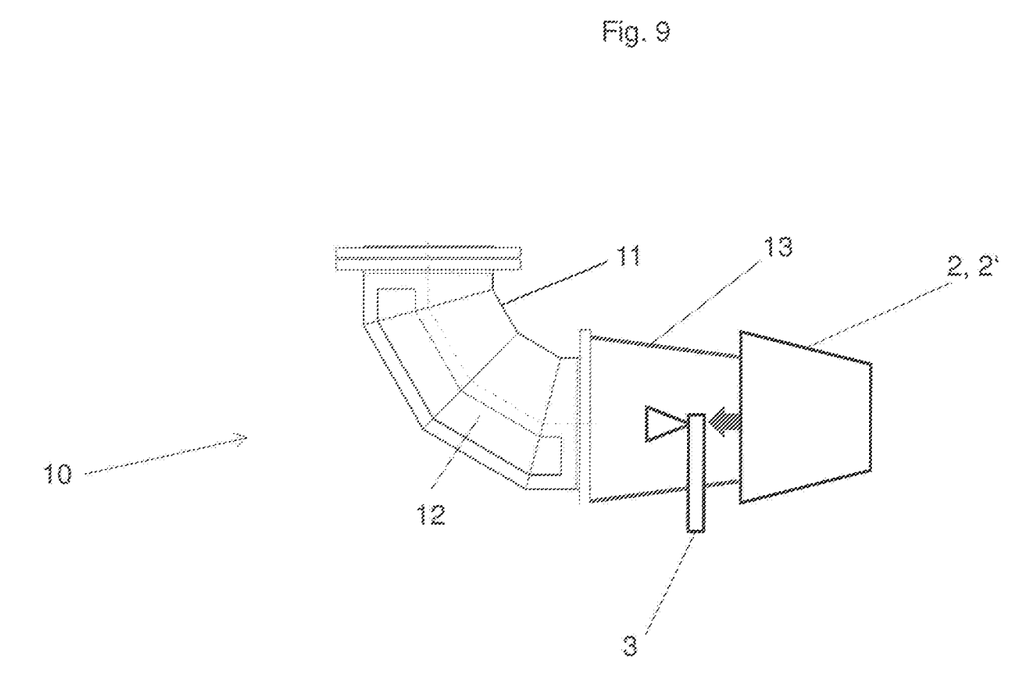
FIG. 9 shows a detail of the exhaust gas conduit.

FIG. 9 shows a view in section of a detail of the exhaust gas conduit 10. It is possible to see here the curved portion 11 of the exhaust gas conduit 10, in which a deflection device 12, here in the form of a baffle plate, is arranged. An injection device 3 for the injection of a reducing agent is arranged in the conical portion 13 of the exhaust gas conduit 10 after the exhaust gases issue from the exhaust gas turbines (2, 2').

The deflection device 12 provides for particularly rapid vaporization of the reducing agent injected by way of the injection device 3. It is further desirable that the deflection device 12 reduces or avoids a thermal shock due to the relatively cool reducing agent impinging on the exhaust gas conduit 10 heated by the exhaust gases.

It is also desirable with the illustrated arrangement that a residual swell imparted to the exhaust gas flow by the exhaust gas turbines 2, 2' promotes mixing of the injected reducing agent and the exhaust gas flow.

LIST OF REFERENCES USED 1 internal combustion engine
2, 2' exhaust gas turbine
3 injection device
4 muffler
5 catalytic converter device
6 exhaust gas heat exchanger
7 end muffler
8 flue stack
9 open-loop/closed-loop control device
10 exhaust gas conduit
11 curved portion of the exhaust gas conduit
12 deflection device, baffle plate
13 conical portion of the exhaust gas conduit
14 manifold
51 catalyst substrate
52 housing
53 substrate block
54 positively locking connection
55 bracket
56 frame
57 coupling location

The invention claimed is:

1. An arrangement comprising:
a stationary internal combustion engine,
a catalytic converter device for exhaust gas after-treatment of non pre-treated exhaust gases of an exhaust gas flow from the stationary internal combustion engine,
an exhaust gas turbine arranged downstream of the stationary internal combustion engine in the exhaust gas flow from the stationary internal combustion engine,
an injection device for injection of a reducing agent for the catalytic converter device,
a muffler, and
an exhaust gas conduit,
wherein the injection device is arranged downstream of the exhaust gas turbine and upstream of the catalytic converter device,
wherein the injection device is arranged upstream of the muffler,
wherein the exhaust gas conduit is configured to guide the exhaust gas flow and the exhaust gas conduit has a conical portion which enlarges downstream,
wherein the injection device is arranged in the conical portion,
wherein the injection device is arranged in relation to the exhaust gas turbine such that a residual swirl imposed on the exhaust gas flow by the exhaust gas turbine promotes mixing of the exhaust gas flow and the reducing agent which has been injected, and
wherein the catalytic converter device comprises:
a bracket for mounting the catalytic converter device on a carrier, and
a catalyst substrate which is configured to be releasably arranged in a housing of the catalytic converter device, and
wherein the catalyst substrate has a cell density of at least 50 cpsi, and less than 350 cpsi.

2. The arrangement as set forth in claim 1, wherein the catalyst substrate is predominantly metallic.

3. The arrangement as set forth in claim 2, wherein the catalyst substrate is completely metallic.

4. The arrangement as set forth in claim 1, wherein the catalyst substrate comprises a plurality of substrate blocks.

5. The arrangement as set forth in claim 4, wherein the substrate blocks are releasably connected to each other and are gas-tightly sealed off relative to each other.

6. The arrangement as set forth in claim 5, wherein the substrate blocks are releasably connected to each other and are gas-tightly sealed off relative to each other by positively locking connections.

7. The arrangement as set forth in claim 6, wherein the positively locking connections are connecting bars which are configured to be hung in a frame in the housing of the catalytic converter device.

8. The arrangement as set forth in claim 4, wherein the substrate blocks are cuboidal.

9. The arrangement as set forth in claim 4, wherein each of the substrate blocks has a coupling location for coupling a lifter thereto.

10. The arrangement as set forth in claim 9, wherein the coupling location is an opening.

11. The arrangement as set forth in claim 1, wherein the catalytic converter device is an SCR catalytic converter device, an oxidation catalytic converter device or an NH3 slip catalytic converter device.

12. The arrangement as set forth in claim 1, wherein the injection device is a two-component injection device with a first component of a liquid reduction agent solution, and a second component of air.

13. The arrangement as set forth in claim 1, wherein the exhaust gas turbine is one of two exhaust gas turbines which are arranged in parallel fluidic relationship, and wherein the injection device is arranged in the exhaust gas flow of a manifold downstream of the two exhaust gas turbines.

14. The arrangement as set forth in claim 1, wherein the exhaust gas turbine is one of two exhaust gas turbines arranged in parallel fluidic relationship, and wherein either the injection device is arranged only in the exhaust gas flow of one of the two exhaust gas turbines or the injection device is one of two injection devices, a first of the two injection devices being arranged in the exhaust gas flow of a first of the two exhaust gas turbines and a second of the two injection devices being arranged in the exhaust gas flow of a second of the two exhaust gas turbines.

15. The arrangement as set forth in claim 1, wherein the exhaust gas conduit has a curved portion, and wherein the injection device is arranged upstream of the curved portion of the exhaust gas conduit.

16. The arrangement as set forth in claim 15, wherein a deflection device is arranged in the curved portion, in an injector of the injection device.

17. The arrangement as set forth in claim 16, wherein the curved portion is a baffle plate.

18. The arrangement as set forth in claim 1, wherein the conical portion is arranged immediately downstream of the exhaust gas turbine.

19. The arrangement as set forth in claim 1, wherein the housing is configured to deflect the exhaust gas flow within.

20. The arrangement as set forth in claim 19, wherein the housing is configured to deflect the exhaust gas flow within through 180°.

21. The arrangement as set forth in claim 1, wherein the injection device is arranged so as to be axially aligned inside the exhaust gas conduit.

22. The arrangement as set forth in claim 21, wherein the injection device is arranged so as to be aligned at least centrally inside the exhaust gas conduit.

23. The arrangement as set forth in claim 1, wherein the cell density is greater than 100 cpsi.

24. The arrangement as set forth in claim 1, wherein the cell density is less than 300 cpsi.

* * * * *